G. E. KILBURN.
VEHICULAR TAIL LIGHT FRONTAL INDICATOR.
APPLICATION FILED DEC. 5, 1912.
1,099,751.    Patented June 9, 1914.
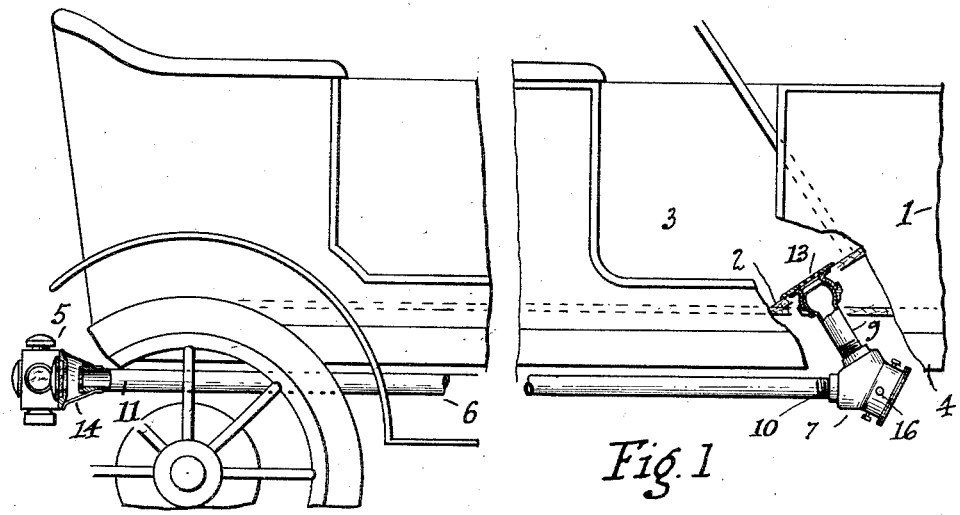
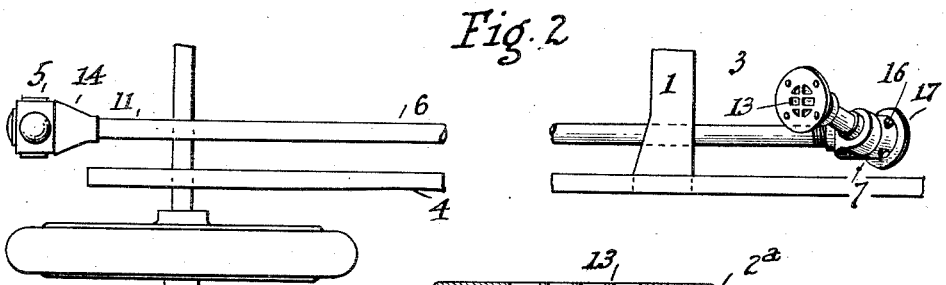
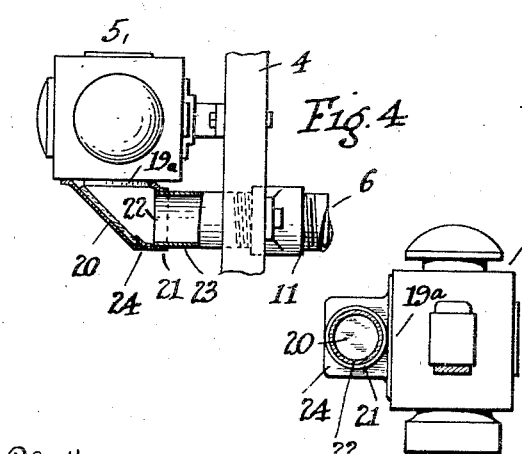
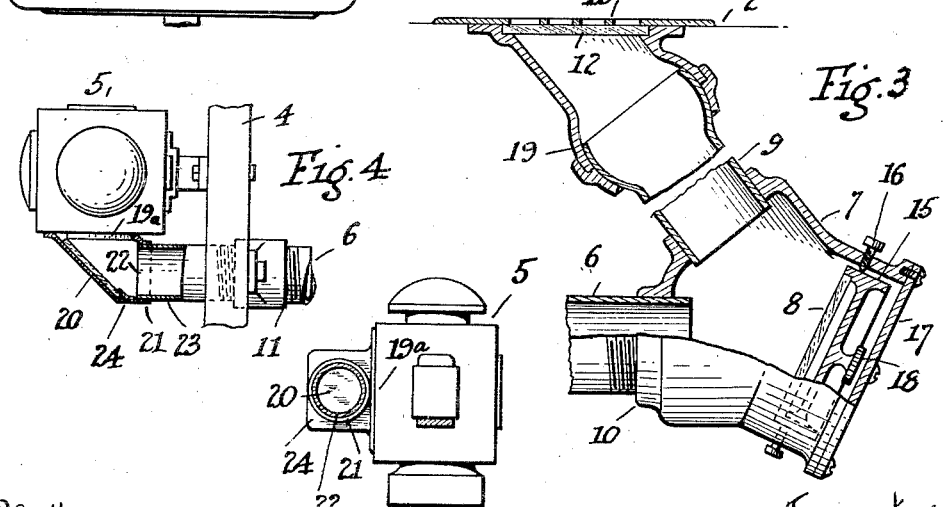
Witnesses
Inventor
George E. Kilburn

UNITED STATES PATENT OFFICE.

GEORGE EDWARD KILBURN, OF BRIGHTON, VICTORIA, AUSTRALIA.

VEHICULAR TAIL-LIGHT FRONTAL INDICATOR.

1,099,751.          Specification of Letters Patent.       Patented June 9, 1914.

Application filed December 5, 1912. Serial No. 735,132.

*To all whom it may concern:*

Be it known that I, GEORGE EDWARD KILBURN, a subject of the King of Great Britain and Ireland, &c., residing at Brighton, in the State of Victoria, Commonwealth of Australia, have invented certain new and useful Improvements in Vehicular Tail-Light Frontal Indicators; and I do hereby declare the following to be a full, clear, and exact description of the invention, such as will enable others skilled in the art to which it appertains to make and use the same.

Vehicles, including motor cars using tail lamps have been provided with devices for enabling the drivers to know—without seeing the lamps—whether the lights were burning.

My invention is one for that purpose, and includes improvements overcoming disadvantages incidental to previous constructions.

I find that while mirrors are theoretically useful they are not practically so if their number is considerable or if they become dirt covered, and I provide a construction by which a single mirror suffices, or in modified form two mirrors. Owing moreover to the great tendency of all mirrors, lamp windows, and glass panes near the road to become coated with mud or dust, I provide special mud and dust excluding means which will prevent the light to be reflected being obscured. I find that the best position in which to place a light conveying tube from the tail lamp to the front of the vehicle or car is under the body (or chassis top) where it will not be in the way, and may be out of sight. I find that the safest and most advantageous position in which to have the tell-tale pane for the driver or chauffeur to keep in view is in front of him, let into the sloping or flat floor or wall in the base of his compartment. The construction will be adjustable to suit differences in the builds or styles of motor cars or vehicles, and adjustment of the mirror which throws the light upon the tell-tale pane is provided for. This pane is of ground glass, or other convenient material, protected by a grating, or wire work of any suitable kind at will.

In the drawings herewith construction which is preferred is illustrated, and a modification of parts of it, to provide for the utilization of those tail lamps which when in position are not provided with a window on the side facing the car front, but which have a side window.

Figure 1 is a diagrammatic side view of parts of a car with my device attached; Fig. 2 is a plan view showing parts in Fig. 1; Fig. 3 shows on a larger scale the front part of my construction, partly in vertical section; Figs. 4 and 5 show respectively a plan view, and a view from the front looking toward the rear at the tail lamp, these views being partly sectional and also on the larger scale.

In these views 1 is a vehicle or car body; 2 a sloping front wall or floor in the driver's compartment, marked 3. $2^a$ shows a flat floor; 4 is a frame or chassis of a vehicle or car; 5 a tail lamp; 6 a tube extending forwardly from the lamp to a reflector box 7 which is adjustable, and contains an adjustable reflector 8, and has a branch tube 9. Tubes 6 and 9 may be telescopic or suitably made of desired length. A joint 10 between tube 6 and box 7 allows rotation of the latter to bring tube 9 and its tell-tale pane 12 to any desired position, and as is seen in Fig. 2 the said pane need not be set vertically above tube 6.

It may be found necessary in order to suit the build of car to which the invention is applied that the tell-tale pane be located to some particular side of the vertical position. The pane is held in a casing having in some cases a ball and socket joint 19.

The rear 11 of tube 6 is provided with a dust excluder as a bell shaped sleeve 14 which may be wholly or partly of flexible material or rubber, with the front fitting over tube end 11, and the rear enlarged open end pressed against or near the lamp and thus excluding dust from the pane thereof. A pane is ordinarily provided in rear end 11.

Light from the lamp will pass along tube 6 to reflector or mirror 8, by which it is thrown upon tell-tale 12. To allow of mirror 8 being adjusted, the end of box 7 is a door of removable plate 17; and the deep mirror frame 15 (which may have a handle 18) is held by a series of set screws 16 bearing on any suitable parts of the said frame, and projecting through box 7. Hence according to the setting of branch 9 the mirror will be adjusted until it reflects light properly on glass 12.

In the modification, $19^a$ is a side window of lamp 5, and 20 a reflector held in a casing or box 24 made of any suitable material and set close to the lamp to exclude dust. This casing has a front end 21 (with or without a glass pane filling its opening 22). Into or over the end 21 there is fitted the rear of a tube 23 which may be of rubber or flexible material and is connected adjustably to the rear 11 of tube 6; thus not only is dust excluded, but the light reflected from mirror 20 will strike mirror 8. Mirror 20 may at will also be made so as to allow some side light to pass through it. Box 24 in some cases is riveted or fixed to the lamp side.

The straight tubing 6 which conveys light under the car body direct from the lamp or reflector 20 forwardly to box 7 is supported by any suitable means (not shown) as brackets on the frame or chassis.

I may omit some of the details described in suitable cases while still retaining some of the matter claimed hereinafter.

The four screws 16 shown enable each pair of oppositely set screws to be adjusted to hold mirror casing 15 in turn during adjustment. All the screws are tightened after adjustment.

Having described this invention, what is claimed by Letters Patent is:—

1. The combination with a vehicle lamp, of a tube for conducting rays of light emitted from said lamp, a housing provided at the opposite end of said tube, a reflector arranged in said housing for intercepting the rays conducted through said tube, a second tube connected with said housing for conducting the reflected rays therefrom, and a light-transmitting cap revolubly mounted over the free end of said second tube and provided with an inclined head adapted to constantly change its plane of position when said cap is revolved whereby said head may be made to fit different styles of foot-boards.

2. The combination with a vehicle lamp, of a tube for conducting rays of light emitted from said lamp, a housing provided at the opposite end of said tube, a reflector arranged in said housing for intercepting the rays conducted through said tube, a second tube connected with said housing for conducting the reflected rays therefrom, a light-transmitting cap, a universal joint for connecting said cap to the free end of said second tube, an inclined open head on said cap adapted to assume different planes of position when the cap is moved through said universal joint to accommodate the same to various types of foot-boards, and a glass closing said head through which the reflected rays of the vehicle lamp are visible.

3. The combination with a vehicle lamp, of a tube for conducting rays of light emitted from said lamp, a housing provided at the opposite end of said tube, a reflector arranged in said housing for intercepting the rays of light conducted through said tube, a second tube connected with said housing at an angle to the vertical and for conducting the reflected rays therefrom, a light-transmitting cap, a universal joint between said second tube and cap for connecting the same together, an inclined open head on said cap adapted to assume different planes of position when the cap is moved through said universal joint to accommodate the same to various types of foot-boards, a glass closing said head through which the reflected rays of the vehicle lamp are visible, and a grating covering said head and secured to the inner face of the foot-board.

In witness whereof I have hereunto set my hand in the presence of two witnesses.

GEORGE EDWARD KILBURN.

Witnesses:
WILLIAM L. BEATTIE,
BEATRICE M. LOWE.